Sept. 12, 1972     H. J. SETZER     3,690,999
PRECUT COMPOSITE TAPE STRUCTURE
Filed April 28, 1970

INVENTOR
HENRY J. SETZER
BY George E. Kersey
ATTORNEY

| United States Patent Office | 3,690,999 |
|---|---|
| | Patented Sept. 12, 1972 |

3,690,999
PRECUT COMPOSITE TAPE STRUCTURE
Henry J. Setzer, East Brunswick, N.J., assignor to
Dennison Manufacturing Company, Framingham, Mass.
Filed Apr. 28, 1970, Ser. No. 32,608
Int. Cl. B32b 3/10; B41j 1/30
U.S. Cl. 161—39                                     5 Claims

ABSTRACT OF THE DISCLOSURE

A precut tape structure for use with an embossing machine. One end of the structure includes a tab that is at least partially severed from the structure. The tab is of a configuration to facilitate manufacture and processing of the tape structure, and removal of a protective liner from the back of the structure. The tab is also configured to reduce the possibility of machine interference and accidental detachment. The other end of the structure is of a different configuration to distinguish it from the tab end.

BACKGROUND OF THE INVENTION

This invention relates to machine embossable structures, and more particularly, to tape structures for use with cutterless embossing machines.

The typical machine for producing characters on an embossable medium, such as plastic tape used in labeling, is fed from a tape magazine and includes a cutter for severing the tape after embossment has taken place. Machines of this type, and the plastic tape that they employ, are in wide use. However, not only does the cutter add complexity and expense to the machine, it also tends to become unreliable after extensive use.

As a result, embossing machines have been proposed in which the cutter can be omitted. One such machine is described in the co-pending application of Arnold R. Bone, Ser. No. 875,601 filed Sept. 9, 1969 now Pat. No. 3,633,722, which is a continuation-in-part of Ser. No. 830,009, filed June 3, 1969, now abandoned.

A cutterless embossing machine employs strips of tape which are precut to desired lengths. Each such strip desirably bears an adhesive coating over which there is a removable, protective liner or backing. After a tape strip has been embossed, its liner is peeled away and the strip is affixed by its adhesive coating to an object being labeled.

Accordingly, it is an object of the invention to provide a tape structure which is suitable for use with embossing machines. Another object is to provide a tape structure with an easily removed protective backing for cutterless embossing machines.

Still another object of the invention is to provide a layered tape structure with a detachable portion that promotes the removal of a protective backing without detriment to the operation of a cutterless embossing machine. A related object is to prevent accidental detachment of the detachable portion due to preliminary handling of a tape structure, feeding of the structure into an embossing machine or operation of the machine itself.

SUMMARY OF THE INVENTION

In accomplishing the foregoing and related objects, the invention provides, for a cutterless embossing machine, a composite structure which includes a length of embossable material having opposite ends of different configuration, a coating of adhesive on one surface of the embossable material and a protective backing or liner on the adhesive layer. One end of the embossable material is at least partially severed from the remainder of the structure and forms a tab for removing the protective liner after embossment has taken place.

In accordance with one aspect of the invention, the embossable structure is a flat, laminated assembly with a rounded leading end and a squared trailing end. The rounding of the leading end facilitates insertion of the tape structure into the embossing machine and enhances the appearance of the label being formed. The squaring of the trailing end provides straight-line edges which simplify the manufacture and handling of the tape structure.

Moreover, because of the difference in the two ends of the structure, it is readily apparent which end is to be fed into the machine.

The tab is at the squared trailing end and is partially severed from the remainder of the tape strip along a rounded line of separation. Because of the rounding of the line of separation, coupled with the squaring of the outer end of the tab, there is less likelihood that the tab will become accidentally detached during preliminary handling of the tape structure. To promote the appearance of the resulting label, the line of separation at the tab is desirably symmetrical with respect to the leading end of the structure.

In addition, when the tab is only partially severed from the tape strip, leaving, for example, a narrow hinge at one side or the other, there is an additional degree of rigidity in the tape structure without any significant reduction in the ease of removability of the protective liner using the tab.

BRIEF DESCRIPTION OF THE DRAWINGS

Other aspects of the invention will become apparent after considering an illustrative embodiment, taken in conjunction with the drawings in which.

DETAILED DESCRIPTION OF AN ILLUSTRATIVE EMBODIMENT

Figure 1:
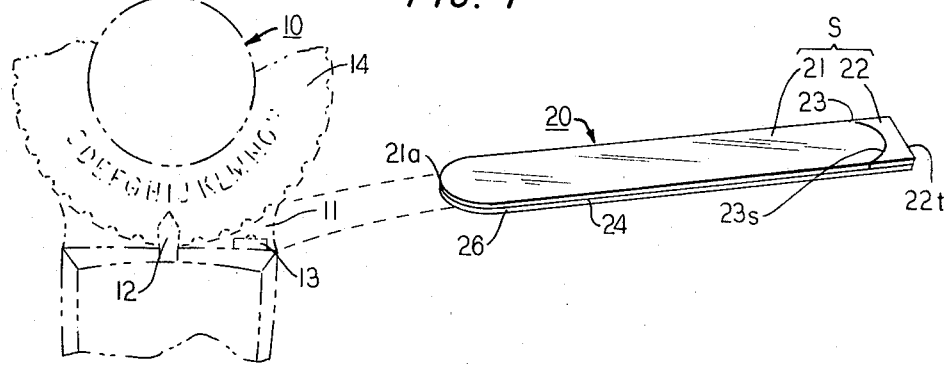
FIG. 1 is a perspective view of a tape structure in accordance with the invention, shown with an outline of a portion of a cutterless embossing machine.

Turning to the drawings, the composite tape structure 20 of FIG. 1 is adapted in accordance with the invention for being embossed by a cutterless embossing machine 10 (shown in partial outline).

The machine 10 is illustratively constructed as described in the co-pending application of Arnold R. Bone, Ser. No. 875,601, filed Sept. 9, 1969. In the use of the machine, the tape structure 20 is inserted into a channel 11 and advanced by one character space at a time to the embossing position beneath a pointer 12. Each advance of the structure 20 is made by partially depressing an actuator (not shown) located on the underside of the machine 10 to operate a feed wheel (not shown) in the channel 11 beneath a guide roller 13.

When under the pointer 12, the tape structure 20 becomes embossed, by full depression of the actuator, with the character indicated on the dialable embossing wheel 14.

Since the machine 10 does not have a cutter, the tape structure 20 is precut to a desired length. In addition, the structure 20 is a layered assembly of a flat tape strip S (with two portions 21 and 22), an adhesive coating 24 on the underside of the strip S and a protective liner or backing 26 for the coating 24.

Illustratively, the strip S is of vinyl chloride plastic which becomes whitened in those areas that are subjected to deformation by the embossing wheel 14. The adhesive 24 is of a pressure sensitive type, and the protective backing 26 is typically of polyethylene plastic which has less affinity for adhesive than does vinyl, so that the backing is easily detachable. It is to be understood that the structure 20 may include other layers as well. For example, where the strip S is of transparent material, a pigmented layer is included between it and the adhesive 24.

Inasmuch as the machine 10 is cutterless, it does not include the commonly encountered blade that forms a tab for the removal of the protective backing 26 after embossing has been completed. Instead, the tape strip S includes a label portion 21 and a preformed tab portion 22. Since the tab 22 is preformed, it is desirably at the trailing end of the structure 20 in order to limit the possibility of interference with the operation of the machine 10. Further, the performance of the tab permits careful control over its configuration and avoids the difficulties that are sometimes encountered where a tab is formed on an embossing machine.

As shown in FIG. 1, the tape structure 20 has a leading end 21a with a rounded contour and a trailing end 22t with a squared contour. The rounding of the leading end 21a facilitates insertion of the tape structure 20 into the channel 11 of the machine 10. The squaring of the trailing end 22t not only serves to clearly distinguish it from the leading end 21a, but also facilitates manufacture and handling of the tape structure. Because of the squaring, the tape structure has a straight-line trailing end that is easy to produce and tends to distribute the forces applied to it during handling, instead of concentrating them at apex regions as could be the case for an irregular or non-linear trailing end. Moreover, the presence of square corners at the trailing end 22t can simplify the alignment techniques used during packaging.

In addition to having a rounded leading end 21a which promotes machine operation and a squared trailing end 22t which facilitates manufacture and packaging, each strip S is further configured to prevent accidental detachment of the tab 22 from the label portion 21.

Figure 2A:
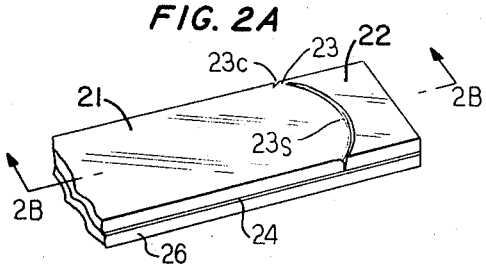
FIG. 2A is a perspective view of a fragment of the tape structure of FIG. 1 showing details of its tab portion.

For that purpose, the tab 22 is at least partially severed from the label 21 along a rounded line of separation 23s, as shown in detail in FIG. 2A. The line of separation 23s is desirably a mirror image of the rounded leading edge 21a to produce a symmetrical label portion 21. Since the region of separation is rounded, there is a reduced likelihood that pressure on the trailing end 22t of the tab 22 will cause it to depart from its desired coplanar orientation with the label portion 21. Coplanar orientation is desirable during the feed of the structure 20 to prevent any inadvertent interference with machine operation. By contrast, a tab which has a linear region of separation with respect to the remainder of a tape structure, is more easily deflected from the desired coplanar condition.

The region of separation 23s is formed by a die that penetrates through the strip S and into contact with, but not through, the backing 26 over at least a major portion of its width. As shown in FIG. 2A, the separation is over substantially the entire width of the tape strip S, with an uncut portion at the very edge of the strip constituting a narrow hinge 23 left between the tab 22 and the label portion 21. This hinge 23 provides additional rigidity for the tab 22 with respect to the structure 20 and helps prevent either accidental deflection or detachment of the tap 22. Since the hinge 23 lies near the end of a rounded contour at the edge of the strip S, it is readily sheared as the tab and backing are peeled from the label 21.

It is to be understood that where the added rigidity provided by the hinge 23 is not required, it may be omitted. Further, the width of the hinge 23, which is desirably less than the thickness of the strip S, is readily controlled by the extent to which the die used to form the contour 23s extends from one side of the strip S to the other. The width of the hinge 23 can also be controlled by its proximity to a die incision 23c.

Figure 2B:
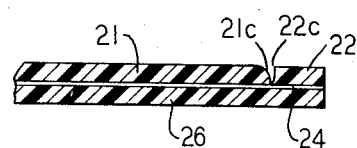
FIG. 2B is a cross sectional view of the fragment of FIG. 2A.
Figure 2C:
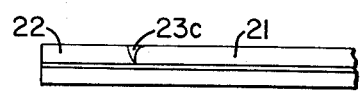
FIG. 2C is a far side view of the fragment of FIG. 2A.

The nature of the cut that forms the line of separation 23s is illustrated by the cross-sectional view of FIG. 2B. The cut is in the form of a notch which is wider at the upper surface of the strip than at the backing 26, with a convex contour 21c on the label portion 21 of the strip S. This results in a rounded shoulder which is less likely to engage an obstruction that could cause separation of an applied label from an object to which it has been affixed. Lessened interference with adhesion is particularly desirable for that part of the strip S where the backing 26 is initially removed. For the tab 22, which is discarded after the backing has been peeled from the label, the contour 22c formed by the die is concave with respect to the tab because that kind of curvature is readily formed on the die.

Figure 3:
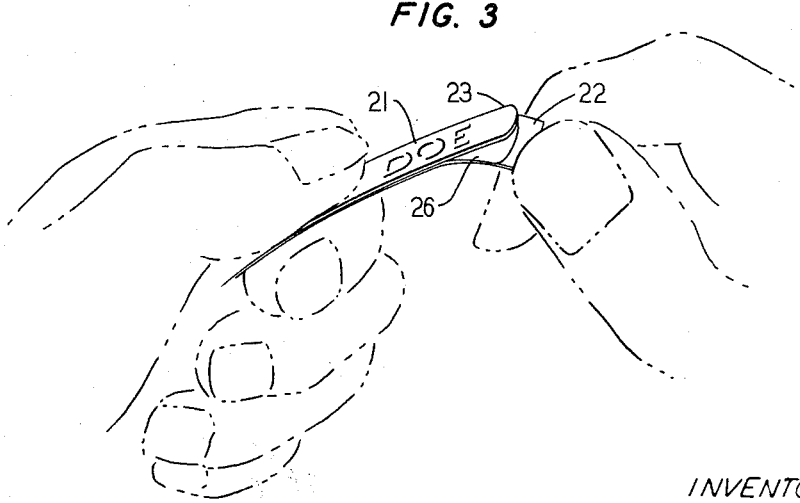
FIG. 3 is a sketch showing the removal of a protective backing from the label portion of the structure in FIG. 1, after embossment with a cutterless machine.

Once the desired label has been formed, the backing 26 is removed as illustrated in FIG. 3. The tab 22 and that portion of the backing 26 attached to it are jointly moved away from the label portion 21. As noted above, it is occasionally desirable for the tab 22 to be attached near the other edge of the label 21 by a hinge 23. During the action of separating the backing 26 from the label 21 using the tab 22, the hinge which lies along the edge of the interior curvature 23s, affords little resistance to the resultant shearing forces and the tab 22 becomes completely detached from the label 21. The backing 26 is then peeled away from the label 21 to expose the adhesive 24.

While various aspects of the invention have been set forth by the drawings and the specification, it is to be understood that the foregoing detailed description is for illustration only and that various changes in parts, as well as the substitution of equivalent constituents for those shown and described, may be made without departing from the spirit and scope of the invention as set forth in the appended claims.

What is claimed is:

1. A composite tape structure for embossment of indicia by a machine, comprising
    a strip of tape;
    a layer of pressure-sensitive adhesive on one surface of said strip of tape;
    a protective liner upon said layer of adhesive and coextensive therewith; and
    means included in said strip of tape at one end thereof for promoting the removal of said protective liner, comprising a tab that is partially severed from the remainder of said strip along an interior line of separation by a notch which extends to said liner and is wider at the upper surface of said strip than at said liner.

2. A composite tape structure as defined in claim 1 wherein
    said strip of tape has opposed ends of different configuration, one end being rounded and the other end being squared;
    and said tab is at least partially severed from the remainder of said strip along an interior line of separation which is rounded.

3. A tape structure as defined in claim 2 wherein the remainder of said strip forms a label portion thereof with a rounded shoulder that has a convex contour at said notch.

4. A composite tape structure for embossment with prescribed indicia by a machine comprising
- a length of embossable material having opposed ends of different configuration;
- a layer of pressure-sensitive adhesive on one surface of said embossable material;
- a protective liner upon said layer of adhesive and coextensive therewith;
- and means included in said length of said embossable material at one end thereof and at least partially severed therefrom for promoting the removal of said protective liner, said length of embossable material being a strip of tape and the promoting means comprising a tab that is severed from the remaining portion of said strip except at an uncut portion at the very edge of the strip constituting a hinge at said edge.

5. A tape structure as defined in claim 4 wherein there is a die incision closely adjacent to said hinge.

References Cited
UNITED STATES PATENTS

| | | | |
|---|---|---|---|
| 3,237,494 | 3/1966 | Norvelle | 197—6.7 X |
| 2,688,331 | 9/1954 | Bogoslowsky | 161—406 X |
| 3,035,957 | 5/1962 | Morgan | 161—406 X |
| 3,036,945 | 5/1962 | Souza | 161—406 X |
| 2,080,733 | 5/1937 | Mull | 161—406 X |

PHILIP DIER, Primary Examiner

U.S. Cl. X.R.

161—113, 167, 406; 197—6.7